3,836,647
WASH-RESISTANT SKIN PREPARATION
Paul M. Lange, Midland, Mich., assignor to Dow
Corning Corporation, Midland, Mich.
No Drawing. Continuation-in-part of application Ser. No.
83,149, Oct. 22, 1970, which is a continuation-in-part
of application Ser. No. 645,591, June 13, 1967, both
now abandoned. This application May 7, 1973, Ser.
No. 358,254
Int. Cl. A01n *9/00;* A61k *21/00;* A61l *13/00*
U.S. Cl. 424—184                                    8 Claims

ABSTRACT OF THE DISCLOSURE

The present invention relates to novel skin preparations which, when applied to the extremities or other parts of the body will resist removal from the surface of the skin by repeated washings or the like. Illustrative of the skin preparations of this invention is a mixture consisting essentially of a trimethylsilyl endblocked diorganopolysiloxane, a hydroxyl or alkoxyl endblocked diorganopolysiloxane that is compatible with the above, a benzene-soluble organosilicon resin copolymer, and a pharmaceutically effective medicament for the skin. The skin preparations can be in the form of ointments, emulsions, dispersions, or as solutions which have been prepared in a nontoxic, volatile solvent. It has been found that the preferred form is as a dispersion. This invention also relates to methods for preventing irritation of the skin by water or water-borne irritants which comprise applying thereto the skin preparations disclosed herein.

---

This application is a continuation-in-part of U.S. application Ser. No. 83,149 filed Oct. 22, 1970 which in turn is a continuation-in-part of application Ser. No. 645,591, filed June 13, 1967. Both applications are now abandoned.

The present invention relates to novel skin preparations and more particularly to skin preparations which will resist removal from the surface of the skin by repeated washings or the like.

Dentists as well as other individuals whose hands are frequently subjected to a wet, occlusive environment occasioned by multiple washings often encounter severe and uncomfortable problems. For example, because dentists must necessarily wash or immerse their hands in water for extended periods of time during each working day, the skin may tend to become inflamed due to this continual contact with water. In view of this inherent problem, a definite need exists for the provision of a material which will effectively protect the skin from such deleterious effects.

U.S. Pats. 2,678,893 and 2,681,878, respectively, disclose similar compositions; however, in each case the proportions are considerably different and are such that they would be totally unsuitable for the purposes intended to be encompassed by the instant invention.

In accordance with the above, it is an object of the present invention to provide novel skin preparations that effectively protect the skin from the aforementioned effects and display the further advantage of being considered generally nontacky to the touch and which are thus cosmetically acceptable to the user.

It is also an object of this invention to produce novel skin preparations which can be utilized in the form of ointments, emulsions, dispersions, or as solution which have been prepared in an appropriate nontoxic, volatile solvent. In view of the fact that the preparations are available in a number of forms, one has the opportunity of selecting the particular form which may prove most suitable, depending upon the circumstances existing at the time of need.

It is still another object of this invention to provide novel skin preparations which may have incorporated therein, various medicaments for the skin. For this reason, the wash-resistant characteristic of the compositions of this invention can be employed so as to apply to the extremities or other parts of the body a medicament for the skin which will remain on the surface thereof for prolonged periods of time even after being subjected to repeated or multiple washings. As a result, it may no longer be necessary to periodically reapply the desired medicament to the skin as was heretofore the case.

The exact nature of the invention as well as other objects and advantages thereof will become readily apparent from the detailed description which follows.

The present invention relates to a composition which is a mixture of (A) 100 parts by weight of a trimethylsilyl endblocked diorganopolysiloxane having a viscosity at 25° C. in the range of from 20 cs. to 1,000,000 cs., and which consists essentially of units of the formula $R_2SiO$ in which R is a monovalent hydrocarbon radical containing from 1 to 6 carbon atoms inclusive, (B) from 0 to 200 parts by weight of a hydroxyl or alkoxyl endblocked diorganospolysiloxane in which the alkoxyl radical contains from 1 to 6 carbon atoms inclusive having a viscosity at 25° C. in the range of from 20 cs. to 1,000,000 cs., which is compatible with (A) and in which the organic radicals are selected from the group consisting of methyl, ethyl, vinyl, and phenyl radicals, at least 75 percent of the total number of organic radicals being aliphatic, (C) from 1 to 200 parts by weight of a benzene-soluble organosilicon resin copolymer consisting essentially of units of the average formula

in which *n* has an average value of from 1.0 to 1.8 and in which R is as defined above, the weight ratio of (C) being no more than 200 parts (C) per 300 parts combined (A)+(B), and (D) from 0 to 200 parts by weight of a pharmaceutically effective medicament for the skin.

As noted above, R can be any monovalent hydrocarbon radical containing from 1 to 6 carbon atoms. Hence, illustrative of R is the methyl, ethyl, propyl, isopropyl, butyl, isobutyl, t-butyl, amyl, hexyl, vinyl, allyl, cyclohexyl, and the phenyl radical.

When the hydroxyl or alkoxyl endblocked diorganopolysiloxane (B) is present, it is essential that the ingredients (A) and (B), be compatible. The term "compatible" merely refers to the fact that one part by weight of either ingredient (A) or (B) must be miscible in ten parts by weight of the other ingredient so as to form a single phase in the absence of a common solvent for both ingredients.

It is also essential that there be at least one part by weight of the benzene-soluble organosilicon resin (C) present, in order to effectively impart the required wash resistance of the skin preparations defined herein. It is most desirable that there be at least 5.0 parts by weight of the organosilicon resin (C) present, based upon the above formulation. It is of importance to further note that the wash resistance of the mixture is normally enhanced if (C) is prereacted with (B) or if the viscosity of either ingredient (A) or (B) is proportionately increased. Preferably, the viscosity of ingredients (A) and (B) is at least 100 cs. at 25° C.

Examples of the organosilicon resin (C), which are operative herein, are polymers of the average unit formulae

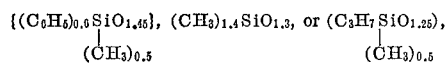

among others.

The pharmaceutically effective medicament (D) can be any suitable medicament which is applied to the skin. Thus, the medicament (D) can be an astringent such as aluminum chloride, aluminum sulfate, aluminum paste, or calamine; an irritant, rubefacient, and vesicant such as coal tar, anthralin, ichthammol, thyme oil, or menthol; a commercially available local anesthetic such as Benzocaine; a commercially available antihistaminic such as Tripelennamine; a caustic and escharotic agent such as exsiccated alum, potassium hydroxide, or silver nitrate; an emollient such as almond oil; an antimicrobial agent such as cetylpyridinium chloride or iodine; a fungicide such as ammoniated mercury; a sulfa drug such as sulfacetamide; a commercially available antibiotic such as Bacitracin; a parasiticide such as gamma benzene hexachloride; a vitamin and nutrient such as Vitamin A; and a sunscreen agent such as glyceral 1-aminobenzoate, as well as combinations of the above, with or without other possible medicaments.

Many of the above medicaments are, of course, suitable for use only under the supervision of proper medical personnel. It must be noted that the amount of the particular medicament employed herein is not critical in order to achieve the objects of the present invention. However, it is to be understood that the desired medicament may be subject to the many normal restrictions which could be imposed when anticipating their use upon the skin.

Because the preparations of this invention are often used as dilute dispersions in a volatile, nontoxic dispersing agent, and because the preparation is most easily applied to the skin in that form, the above mixture is preferably dispersed in a volatile, nontoxic dispersing agent. Solvents or dispersing agents such as water, 1,1,1-trichloroethane, trifluorotrichloroethane, isobutanol, acetone, ethyl acetate, amyl acetate, cyclopentane, diethylether, chloroform, and mixtures of the above have been found to be perfectly satisfactory.

The amount of the preparation that is ultimately applied to the surface of the skin is not critical with the exception that it be applied in sufficient quantity to impart the desired effect. Ordinarily, small amounts are preferable, e.g., merely enough so that the preparation will form a film or barrier upon the surface of the skin.

A preferred embodiment of the present invention consists essentially of a dispersion of (A) 100 parts by weight of a trimethylsilyl endblocked diorganopolysiloxane having a viscosity of from 100 cs. to 1,000 cs. at 25° C., and which consists essentially of units of the formula $R_2SiO$ in which R is a monovalent hydrocarbon radical containing from 1 to 6 carbon atoms inclusive, (B) From 20 to 80 parts by weight of a cocondensation product of (1) from 8.0 to 40.0 parts by weight of a hydroxyl endblocked dimethylpolysiloxane having a viscosity of from 1,000 cs. to 20,000 cs. at 25° C., and (2) from 12 to 60 parts by weight of a benzene-soluble organosilicon resin copolymer of $SiO_2$ units and $$(CH_3)_3SiO_{1/2}$$

units in which the ratio of $(CH_3)_3SiO_{1/2}$ units to the $SiO_2$ units is within the range of from 0.6/1 to 1.2/1, and (C) From 0 to 200 parts by weight of a pharmaceutically effective medicament for the skin, in (D) From 300 to 3,000 parts by weight of a volatile, nontoxic dispersing agent.

It is desired that the organosilicon resin copolymer (B)(2) have a molecular weight of from about 1,500 to 10,000. This particular ingredient is a well-known and readily available commercial material. These copolymers can be prepared by any of the methods known to the art such as by cohydrolysis and condensation of the corresponding silanes, e.g., U.S. Pat. No. 2,676,182, which is incorporated herein by reference.

It has been found that an excellent nontoxic dispersing agent for the skin preparations of this invention is a mixture of approximately 90 parts by weight of 1,1,1-trichloroethane and 10 parts by weight of isopropanol.

The preparations described herein protect the skin from irritation due to frequent washing and the like because they are only slowly removed by soap and water. In addition, they provide protection to the hands from the effects of chapping, the face from windburn or frequent washing, and the feet from the deleterious effects resulting from constant contact with a wet, occlusive environment. In the latter instance, the preparations may provide relief from Tropical Immersion Foot which is of considerable importance to military personnel located in tropical areas. The preparations may also prove useful for preventing diaper rash.

The preparations of the present invention are vapor permeable, and despite their tenacity on the skin, they will not seriously inhibit the normal flow of oxygen and water vapor which passes to and from the skin.

The preparations of this invention also display bacteriostatic properties. They have been shown to be effective in preventing transient bacteria from locating on the extremities, thus reducing the increase of bacterial flora which would ordinarily be expected to occur.

It is to be noted that other ingredients can be added to the compositions of this invention. For example, one can add thickeners such as zinc stearate, bentonite, or silica; emulsifiers or emulsion stabilizers such as glyceral monostearate, stearic acid, methyl cellulose, a mixture of beeswax and borax, or sodium lauryl sulfate; preservatives such as methyl or propyl p-hydroxybenzoate; as well as other additives such as cetyl alcohol, triethanolamine, Sorbitol, Allantoin, perfume, or coloring.

The following examples are illustrative only and are not intended to be construed as limiting the invention which is properly delineated in the appended claims.

Efficiency of the wash-resistant characteristics of the preparation set forth in the examples below was evaluated in the following manner.

Dacron 606 was impregnated with Schaefer's Skrip #42 washable blue ink and the spot of ink was then allowed to dry. The preparation was then applied over the ink spot. The Dacron test sample is subsequently placed into a washing machine (Kenmore Model #600) using a low-load water setting, hot water wash, cold water rinse, standard (normal) cycle, containing 20 ml. of a commercially available detergent (Tide). After each cycle, the test area is examined for any change in the color of the ink spot because removal of the preparation will allow the soap and water to readily dissolve the ink. The degree of protective efficiency of the preparation is ultimately determined by the number of wash cycles required to remove the ink.

EXAMPLE 1

40 parts by weight of a hydroxyl endblocked dimethylpolysiloxane having a viscosity of about 12,500 cs. at 25° C. were heated under reduced pressure for 16 hours at 100° to 175° C. with 60 parts by weight of a benzene-soluble organosilicon resin copolymer consisting essentially of $SiO_2$ units and $(CH_3)_3SiO_{1/2}$ units in which the ratio of the $(CH_3)_3SiO_{1/2}$ units to the $SiO_2$ units was about 0.9/1. The cocondensate had a molecular weight of approximately 3,000.

40 parts by weight of the above product were mixed with 100 parts by weight of a trimethylsilyl endblocked dimethylpolysiloxane having a viscosity of 350 cs. at 25°

C., 200 parts by weight of isopropanol, 1660 parts by weight of 1,1,1-trichloroethane, a trace of perfume, and a trace of an FDA approved green coloring.

The resulting product was a clear-colored liquid which, when applied to the hands, left an invisible, water-repellent film that is non-irritating to the skin. The product is not completely removed from the hands after more than 20 washings with soap and water.

Efficiency of the wash-resistant properties of the above skin preparation was evaluated in accordance with the test described above, and after four wash cycles the ink spot remained intact.

EXAMPLE 2

When the following materials were substituted for the cocondensate of Example 1, equivalent results were obtained.

(A) A benzene-soluble organosilicon resin copolymer consisting essentially of 32 mol percent $CH_3SiO_{3/2}$ units, 30 mol percent $(CH_3)_2SiO$ units, and 38 mol percent

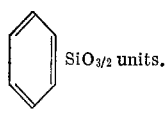 $SiO_{3/2}$ units.

(B) A benzene-soluble resin copolymer consisting essentially of 25 mol percent $CH_3SiO_{3/2}$ units, 20 mol percent $(CH_3)_2SiO$ units, 35 mol percent

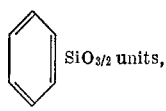 $SiO_{3/2}$ units, and 20 mol percent

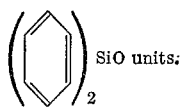 $SiO$ units.

(C) A benzene-soluble resin copolymer consisting essentially of 45 mol percent $CH_2SiO_{3/2}$ units, 40 mol percent

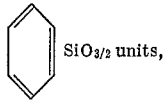 $SiO_{3/2}$ units, 10 mol percent

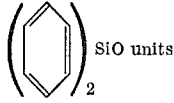 $SiO$ units and 5 mol percent units.

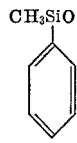

CH₃SiO (D) A benzene-soluble resin copolymer consisting essentially of 70 mol percent

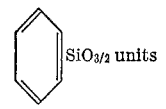 $SiO_{3/2}$ units and 30 mol percent $C_3H_7SiO_{3/2}$ units.

(E) A benzene-soluble resin copolymer consisting essentially of 80 mol percent $CH_2=CHSiO_{3/2}$ units and 40 mol percent $C_3H_7SiO_{3/2}$ units.

EXAMPLE 3

40 parts by weight of a benzene-soluble organosilicon resin copolymer and consisting essentially of $SiO_2$ units and $(CH_3)_3SiO_{1/2}$ units in which the ratio of the $(CH_3)_3SiO_{1/2}$ units to the $SiO_2$ units was about 0.9/1 were mixed with 100 parts by weight of a trimethylsilyl endblocked dimethylpolysiloxane having a viscosity of 350 cs. at 25° C., 200 parts by weight of isopropanol, and 1660 parts by weight of 1,1,1-trichloroethane.

This product was a solution which, when applied to the surface of the skin, left an invisible, water-repellent film that is non-irritating to the skin. When evaluated for wash resistance, the ink spot remained intact for three wash cycles.

EXAMPLE 4

200 parts by weight of a benzene-soluble organosilicon resin copolymer consisting essentially of $SiO_2$ units and $(CH_3)_3SiO_{1/2}$ units in which the ratio of $(CH_3)_3SiO_{1/2}$ units to the $SiO_2$ units was about 0.9/1 were mixed with 200 parts by weight of a hydroxyl endblocked dimethylpolysiloxane having a viscosity of about 40 cs. at 25° C., 100 parts by weight of a trimethylsilyl endblocked dimethylpolysiloxane having a viscosity of 350 cs. at 25° C., and 6640 parts by weight of 1,1,1-trichloroethane.

The above product was a clear-colored liquid which, when applied to the hands, left an invisible, water-repellent film that is non-irritating to the skin.

EXAMPLE 5

40 parts by weight of a hydroxyl endblocked dimethylpolysiloxane having a viscosity of 12,500 cs. at 25° C. were heated under reduced pressure for 16 hours at 100° to 175° C. with 60 parts by weight of a benzene-soluble organosilicon resin copolymer consisting essentially of $SiO_2$ units and $(CH_3)_3SiO_{1/2}$ units in which the ratio of $(CH_3)_3SiO_{1/2}$ units to the $SiO_2$ units was about 0.9/1. The concondensate had a molecular weight of about 3,000.

9.4 parts by weight of the above product were mixed with 100 parts by weight of a trimethylsilyl endblocked dimethylpolysiloxane having a viscosity of 30,000 cs. at 25° C., 156 parts by weight of isopropanol, and 1297 parts by weight of 1,1,1-trichloroethane.

When evaluated for wash resistance, the ink spot still remained intact after three wash cycles.

EXAMPLE 6

For comparative purposes, 100 parts by weight of a trimethylsilyl endblocked dimethylpolysiloxane having a viscosity of 350 cs. at 25° C. were mixed with 143 parts by weight of isopropanol, and 1185 parts by weight of 1,1,1-trichloroethane.

When evaluated for wash resistance, the ink spot was readily removed after one wash cycle, thus indicating the necessity of including the organosilicon resin in the preparations.

EXAMPLE 7

65.3 parts by weight of a trimethylsilyl endblocked dimethylpolysiloxane having a viscosity of 1,000 cs. at 25° C. were well blended with 34.7 parts by weight of a trimethylsilyl endblocked dimethylpolysiloxane having a viscosity of 100 cs. at 25° C., 19.2 parts by weight of a high surface area silica, 20.6 parts by weight of a benzene-soluble organosilicon resin copolymer consisting essentially of $SiO_2$ units $(CH_3)_3SiO_{1/2}$ units in which the ratio of $(CH_3)_3SiO_{1/2}$ units to the $SiO_2$ units was about 0.9/1, and 13.8 parts by weight of a methoxy endblocked dimethylpolysiloxane having a viscosity of 12,500 cs. at 25° C. The above mixture was heated with ammonium carbonate for one hour at 100° to 175° C. and for three hours at 100° to 175° C. under reduced pressure.

The product was a pourable ointment which, when applied to the hands, left a water-repellent film that is non-irritating to the skin.

EXAMPLE 8

When 5.0 parts of calamine were incorporated in the formulation of Example 7, equivalent results were obtained.

EXAMPLE 9

Each of the following formulations impart a wash-resistant, nontacky, water-repellent film on the skin of the hands or the feet when applied thereto:

(I) An emulsion of (a) 10 parts by weight of the solvent-free mixture of the silicone ingredients of Example 1,
(b) 3.0 parts by weight of glycerol monostearate,
(c) 1.0 part of stearic acid,
(d) one-half part by weight each of beeswax and borax as an emulsifier,
(e) 0.01 part by weight of methyl p-hydroxybenzoate, and
(f) 80 parts by weight of water.

(II) An emulsion of (a) 40 parts by weight of the solvent-free mixture of the silicone ingredients of Example 1,
(b) 15 parts by weight of cetyl alcohol,
(c) 1.0 part by weight of sodium lauryl sulfate,
(d) a trace of sorbic acid, and
(e) 43 parts by weight of water.

That which is claimed is:

1. A composition of matter which is composed of
(A) 100 parts by weight of a trimethylsilyl endblocked diorganopolysiloxane having a viscosity at 25° C. in the range of from 20 cs. to 1,000,000 cs., and which consists essentially of units of the formula $R_2SiO$ in which R is a monovalent hydrocarbon radical containing from 1 to 6 carbon atoms inclusive,
(B) from 0 to 200 parts by weight of a hydroxyl or alkoxyl endblocked diorganopolysiloxane in which the alkoxyl radical contains from 1 to 6 carbon atoms inclusive having a viscosity at 25° C. in the range of from 20 cs. to 1,000,000 cs., which is compatible with (A) and in which the organic radicals are selected from the group consisting of methyl, ethyl, vinyl, and phenyl radicals, at least 75 percent of the total number of organic radicals being aliphatic,
(C) from 1 to 200 parts by weight of a benzene-soluble organosilicon resin copolymer consisting essentially of units of the average formula

in which n has an overage value of from 1.0 to 1.8 and in which R is as defined above, the weight ratio of (C) being no more than 200 parts (C) per 300 parts combined (A)+(B), and
(D) from 0 to 200 parts by weight of a pharmaceutically effective medicament for the skin.

2. The compositions as recited in claim 1 in which the skin preparation is dispersed in a volatile, nontoxic dispersing agent.

3. The composition which is a dispersion of
(A) 100 parts by weight of a trimethylsilyl endblocked diorganopolysiloxane having a viscosity of from 100 cs. to 1,000 cs. at 25° C., and which consists essentially of units of the formula $R_2SiO$ in which R is a monovalent hydrocarbon radical containing from 1 to 6 carbon atoms inclusive,
(B) from 20 to 80 parts by weight of a concondensation product of
  (1) from 8.0 to 40.0 parts by weight of a hydroxyl endblocked dimethylpolysiloxane having a viscosity of from 1,000 cs. to 20,000 cs. at 25° C., and
  (2) from 12 to 60 parts by weight of a benzene-soluble organosilicon resin copolymer of $SiO_2$ units and $(CH_3)_3SiO_{1/2}$ units in which the ratio of $(CH_3)_3SiO_{1/2}$ units to the $SiO_2$ units is within the range of from 0.6/1 to 1.2/1, and
(C) from 0 to 200 parts by weight of a pharmaceutically effective medicament for the skin, in
(D) from 300 to 3,000 parts by weight of a volatile, nontoxic dispersing agent.

4. The composition as recited in claim 3 in which (A) is a dimethylpolysiloxane having a viscosity of 350 cs. at 25° C., the viscosity of (B)(1) is 12,500 cs. at 25° C., and the ratio of the $(CH_3)_3SiO_{1/2}$ units to the $SiO_2$ units of the benzene-soluble resin copolymer of (B)(2) is about 0.9/1.

5. The composition as recited in claim 4 in which there are 40 parts by weight of (B).

6. The composition as recited in claim 5 in which the volatile, nontoxic dispersing agent (D) is water.

7. A method for preventing irritation of the skin by water or water-borne irritants which comprises applying thereto the composition as recited in claim 1.

8. A method for preventing irritation of the skin by water or water-borne irritants which comprises applying thereto the composition as recited in claim 3.

References Cited

UNITED STATES PATENTS 3,567,820    3/1971    Sperti _____ 424—184 X
3,655,865    4/1972    Murphy _____ 424—184 X ALBERT T. MEYERS, Primary Examiner D. R. ORE, Assistant Examiner U.S. Cl. X.R.

424—60, 127, 132, 146, 150, 154, 181, 263, 310, 321, 344, 346

UNITED STATES PATENT AND TRADEMARK OFFICE
CERTIFICATE OF CORRECTION

PATENT NO. : 3,836,647
DATED : September 17, 1974
INVENTOR(S) : PAUL M. LANGE

It is certified that error appears in the above–identified patent and that said Letters Patent are hereby corrected as shown below:

Column 7, line 56, "overage" should read --average--.

Signed and Sealed this sixth Day of January 1976

[SEAL]

Attest:

RUTH C. MASON
Attesting Officer

C. MARSHALL DANN
Commissioner of Patents and Trademarks